June 3, 1952 C. E. SLAUGHTER 2,599,493
PACKAGING METHOD
Original Filed Feb. 2, 1945 3 Sheets-Sheet 1
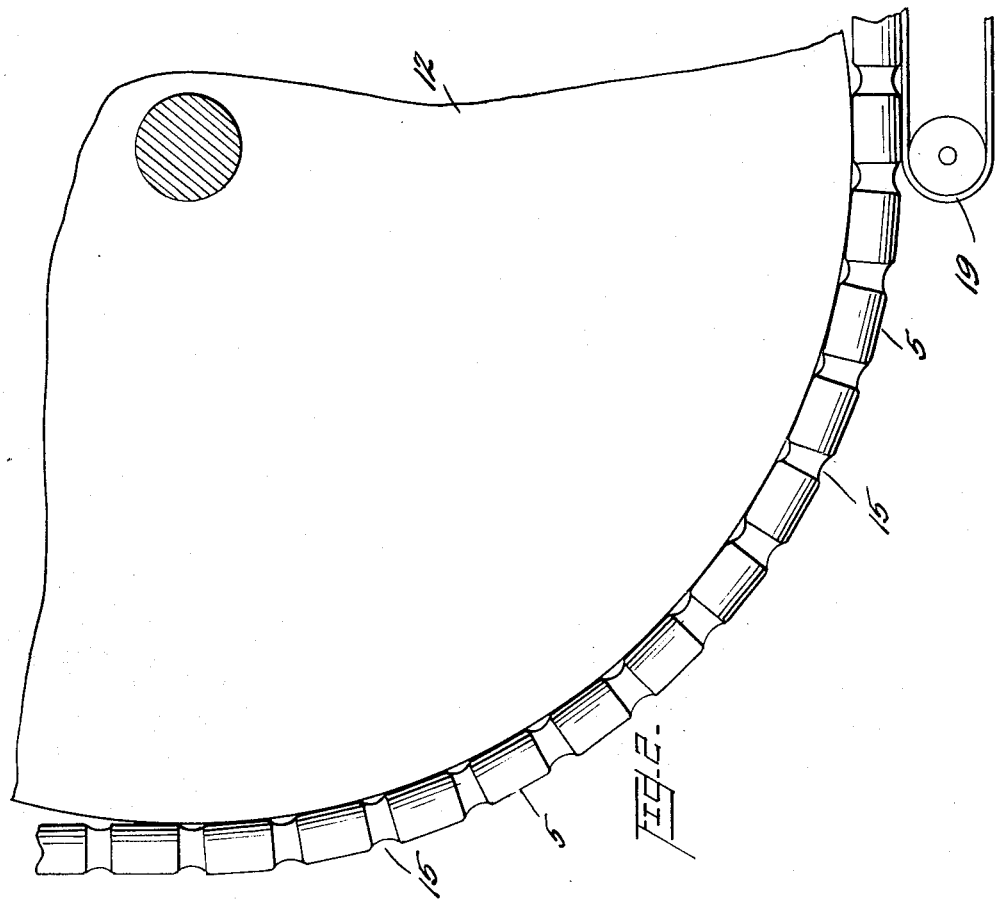
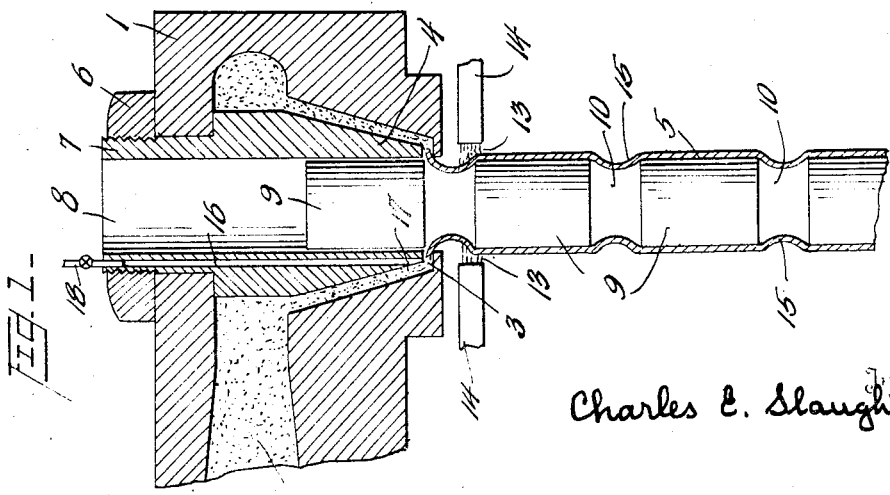
Charles E. Slaughter, Inventor
By Sol Shappirio, Attorney

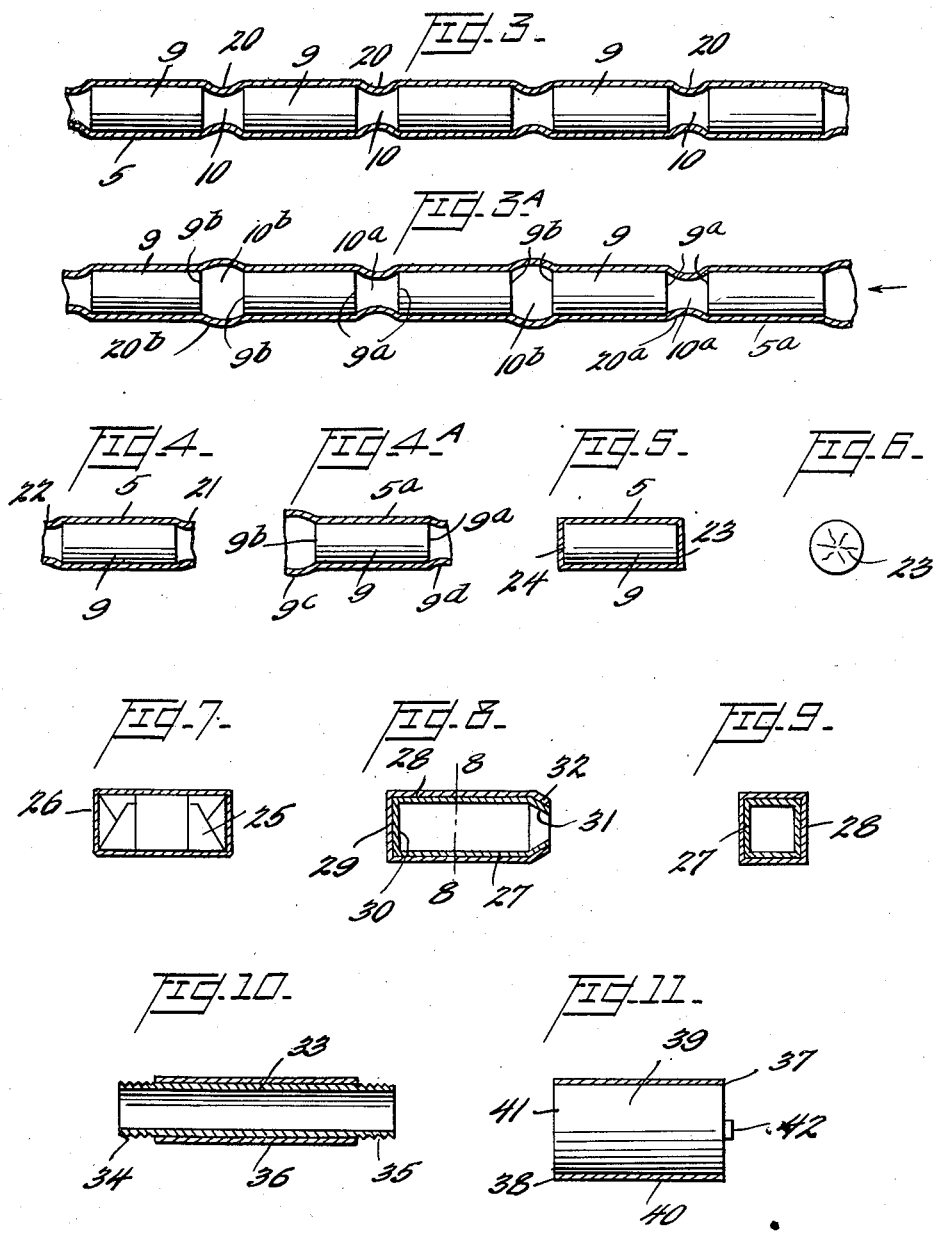

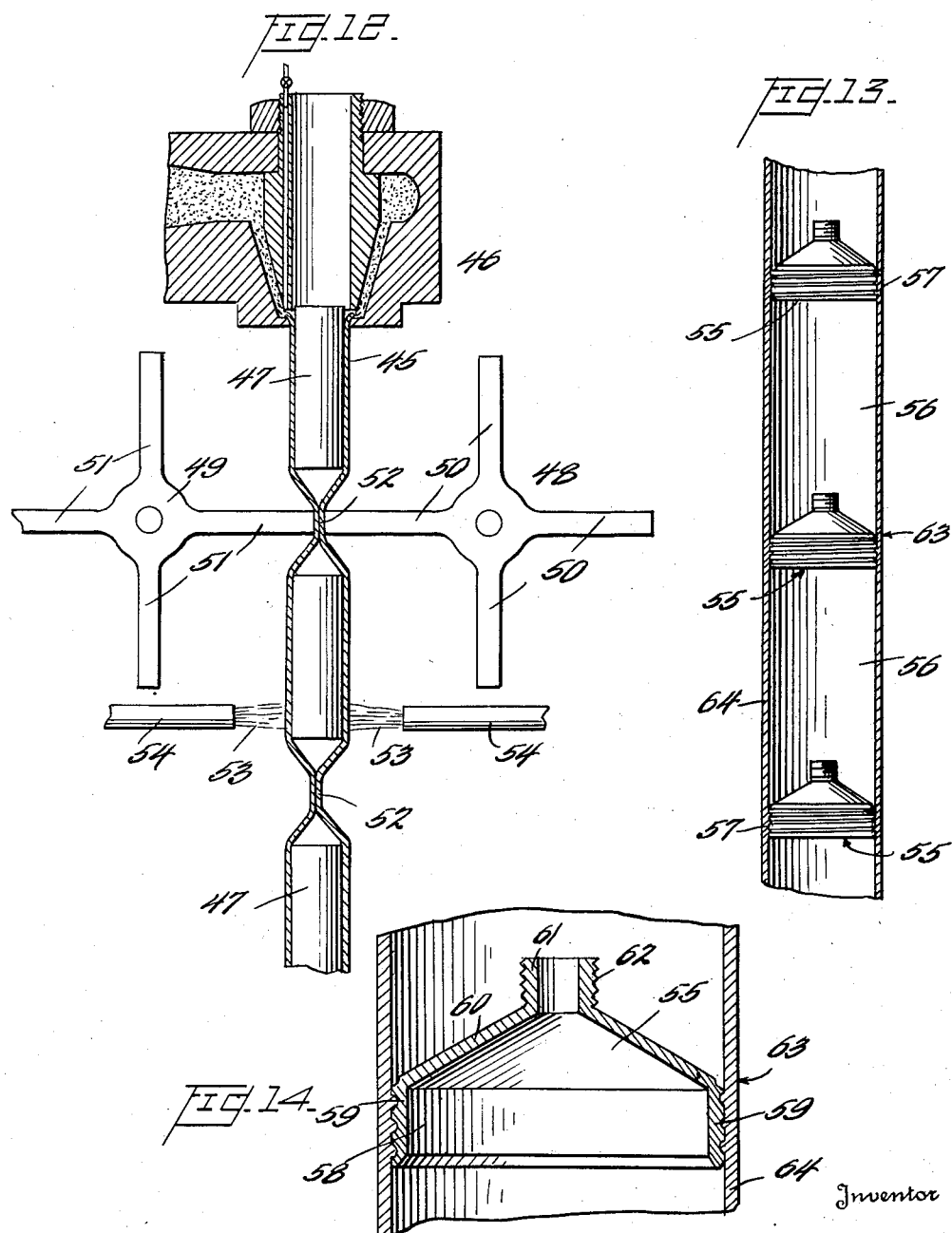

Patented June 3, 1952

2,599,493

UNITED STATES PATENT OFFICE 2,599,493

PACKAGING METHOD

Charles E. Slaughter, New Canaan, Conn., assignor to Extruded Plastics, Inc., Norwalk, Conn., a corporation of Connecticut Original application February 2, 1945, Serial No. 575,856. Divided and this application June 13, 1947, Serial No. 754,536

2 Claims. (Cl. 18—59)

This invention relates to the production of articles carrying a sheath or covering of plastic material, and more particularly relates to packaged articles, the package carrying a covering or protective layer of plastic material, particularly a thin layer thereof, as well as to methods and apparatus for producing such articles and protected or covered packages and to the resulting articles themselves.

There is an ever increasing demand for packaging in water-tight, and even more important, in vapor-proof containers. Heretofore, it has been customary to protect packages by wrapping in lead or aluminum foil and as an additional precaution, rewrapping with a so-called waterproof cellophane or similar material. A great deal of effort has been made to package by means of heat sealing of various kinds of foil and within sheetings of plastic materials but the results have not proved satisfactory. The sealing of such sheets or foils has not actually produced a water-tight or more importantly, a vapor-proof protective coating. Thus heat sealing is sometimes slow, and it frequently leaves air bubbles and weakens the materials around the heat treated edges. In addition, the use of such preformed sheets requires material of substantial thickness so that it can be handled.

Or considering a different field in which analogous results have been sought, attempts have been made to cover a metal tube such as thin wall brass with an insulating plastic covering, as for example, in the production of flashlight cases, dry cells, etc. Injection molding of a thin coating of plastic around a metal tube has not proved satisfactory.

Among the objects of the present invention is the production of sheathed articles carrying a protective coating of plastic produced by efficient, simple, and economical procedures.

Still further objects and advantages of the present invention will appear from the more detailed description set forth below, this more detailed description being by way of illustration and explanation only, and not by way of limitation, since various changes therein may be made by those skilled in the art without departing from the scope and spirit of the present invention.

In connection with that more detailed description, there is shown in the accompanying drawings, in Figure 1, a side elevation of a machine that can be utilized in carrying out the present invention, partly in section; in Figure 2, a side elevational view showing tubing carrying articles therein as taken off of the apparatus of Figure 1; in Figure 3, a continuous length of extruded tubing carrying a series of rigid articles therein in spaced relation one to the other; in Figure 3A, a modification of the article shown in Figure 3; in Figure 4, a single and sheathed article resulting by cutting through the chain of articles of Figure 3; in Figure 4A, a modification of the article shown in Figure 4; in Figure 5, an ensheathed article carrying the plastic coating or protective covering thereon; in Figure 6, an end view of the article of Figure 5; in Figure 7, an end view of a cigarette package carrying the plastic protective covering; in Figure 8, a longitudinal section through an unfilled container carrying the plastic sheath protective covering; in Figure 9, a section on the line 8—8 of Figure 8; in Figure 10, a flashlight casing with the protective sheath thereon; in Figure 11, a dry cell carrying a protective sheath or wrapper; in Figure 12, a modified form of machine, shown in side elevation, partly in section, that can be utilized in carrying out the present invention; in Figure 13, a modified form of chain comprising extruded tubing having spaced articles therein; and in Figure 14, a detail in section of one of the sheathed articles of Figure 13.

In accordance with the present invention, thermoplastic tubing is extruded produced from thermoplastic materials having the properties desired for the particular purposes in hand, such as heat resistance, or water-vapor resistance, rigidity, insulating character, etc. And immediately upon the extrusion of such tubing, rigid articles are inserted within the extruded tubing just as the latter is being extruded, the articles being fed desirably intermittently through the extrusion die into and within the tubing just as it is being extruded, desirably the articles being in spaced relation one to the other. There is thus produced a continuous chain of ensheathed articles or closures comprising a continuous length of extruded tubing carrying a series of rigid articles therein in spaced relation to one another. The tubing may then be cut in any desired way between the spaced articles to give a series of articles carrying such plastic sheaths or covering or protective material and the end sealing then completed in any desired way. The exact manner of handling such articles will depend on the particular articles being treated. Filled packages and articles may have the ends sealed immediately. These and other features will be further illustrated below.

The invention may be utilized in the ensheathing of various types of articles, packages, closures, containers, tubes, dry cells, etc., as long as the articles fed into the tubing during extrusion of the latter, are capable of being handled as rigid discrete bodies so that they may be fed into the tubing in spaced relation as desired. The articles may thus be discrete or rigid packages as distinct from fluent materials and such articles or packages include any type of articles, closures, tubes, etc. For example, any filled, closed, containers; unfilled containers or closures which are subsequently to be filled with any types of articles or materials; discrete lengths of tubing such as metal tubing, paper tubing, cardboard, plastic tubing, etc.; packaged cigarettes, rolls of photographic film; dry cells; etc.

The tubing utilized may be produced from any desired thermoplastic material that can be extruded having the properties desired for the particular packaging or covering operation in hand but most desirably thermoplastic synthetic resinous materials are employed including cellulose derivatives such as the esters and ethers for example, cellulose acetate, cellulose nitrate, cellulose acetate butyrate, ethyl cellulose, benzyl cellulose, etc.; vinyl polymers and copolymers including polymerized vinyl acetate, polymerized vinylidene chloride, and copolymers of vinyl chloride and vinyl acetate; polymerized styrenes, methacrylate and methyl methacrylate resins, polyethylenes, nylon type resins, etc. The choice of the particular material depends on the particular ensheathing or covering operation to be carried out, the nature of the article to be ensheathed or protected, properties such as water-tight packaging, vapor-proof protection, the rigidity of the coating, etc. Further the wall thickness of the extruded tubing depends on many of these considerations but since just as the tubing is being extruded, the article or package to be ensheathed or encased or protected is inserted into the extruded tubing, it is possible to use much thinner wall tubing than can be employed if such tubing is first preformed and subsequently used for application to an article. Thus tubing having as thin a wall as .003" to .0035" up may be employed. Further it should be noted that the plastic material has actually been extruded from the die as the package, etc., is introduced within the extruded tubing. For this reason no excessive pressure, in general no pressure at all, is exerted by the plastic material on the package, etc., except pressure that may be exerted by after-shrinkage of the plastic tubing. But there need be no limit placed on the thickness of tubing wall employed since this may vary with the type of resin and type of packaging being carried out. This wall thickness also is capable of being used depending on the considerations set forth above and also whether the operation is carried out to produce a direct adherence or "welding" of the plastic to the container or other article.

By choice of the thermoplastic synthetic resinous material in connection with the particular material constituting the article to be covered, and the conditions of operation under which the extrusion is carried out, the adherence of the tubing to the article can be controlled. Thus it is possible to extrude synthetic resinous plastic materials onto metallic and non-metallic articles or packaged articles so that the tubing as extruded under the temperature conditions prevailing and the nature of the materials, is welded directly to the package whether metallic or non-metallic. On the other hand, if rapid cooling is effected of the extruded tubing about the article just as it emerges from the die and particularly if the article is precooled as well, the encasement can be carried out without any substantial adherence or welding of the extruded tubing to the article. Even in the latter instance where there is no substantial welding, the extruded tubing can be produced about the article with a snugness and the cooling operation when employed can be utilized to shrink the extruded tubing so that it is closely adjacent to the packaged article even if no actual welding effect is obtained. In these operations the package itself serves as a support for the plastic so that a very thin wall in the tubing can be employed.

If a package is being covered or protected which package is complete with its contents, then it is only necessary to feed such packages at the desired intervals through the extrusion die into the tubing just as the latter is being extruded, leaving sufficient air space between each package to permit heat sealing of the end portions of the plastic tubing about each article after the individual articles carrying the tubing thereabout are severed from the chain of articles produced in accordance with this invention.

If the article being encased or protected is an unfilled container, it can similarly be fed through the die into the tubing just as the latter is being extruded to produce a continuous chain or endless string of empty packages. Splitting halfway between the packages there is obtained an unfilled package or carton or container or closure which is encased except for the open end. The contents then may be inserted into the unfilled container, and the open end then automatically folded over and sealed as by heat.

The tubing which is extruded and utilized for encasement or ensheathing of articles of any desired type, may be adapted to conform to the cross-sectional shape of the package, so that such extruded tubing may be in cross-section, round, rectangular, hexagonal, oval, etc.

Referring to Figure 1 of the drawings for illustrative apparatus that may be utilized in carrying out the present invention, there is shown an extrusion die 1 of cross-head type through which the material 2 being extruded is forced through the extrusion die orifice 3 about the core 4 to form the continuous, seamless, extruded tube 5. The core may be held in place by means of the nut 6 threaded onto the threaded end 7 of the core. The core 4 is provided with a passage 8 that passes directly through the core desirably centrally positioned within the die body 1, which passageway opens into the interior of the tubing 5 as it is being extruded. The articles to be ensheathed or entubed are shown at 9 and are fed through the cross-head in the passage 8 at intervals as the tubing is being extruded so that the tubing 5 is formed directly encasing the article 9 with a space 10 between each article. Any desired means manual or otherwise but preferably automatic means may be utilized for feeding the rigid articles through the passageway into the tubing as it is being extruded. If desired depending on the speed of the operating conditions, the nature of the synthetic resinous material, etc., coolant 13 may be applied from the nozzle 14 as soon as the extruded material has covered the whole of the immediate article passing at this point to form a screen of coolant which may for example, be a water screen, to set the resin and shrink it onto the package so that the tubing inbetween the ensheathed articles is shrunk to a lesser diameter as shown at 15 and set in this condition. An air lock may be used to control the pressure within the tubing.

If desired, the air pressure within the tubing may also be controlled in other ways. Thus a passageway 16 through the core may lead from a point within the tubing where it is first being formed about the article 9, as shown at 17, back through the core 4 to the outlet 18. The production of a few inches of vacuum applied as the package emerges from the die causes the tubing to contract just ahead of the article, and to produce immediate heat sealing of the tubing about the article. The few inches of vacuum may then be replaced by a few inches of water pressure as the next package is inserted. These operations may be carried out correlated with the operations of feeding the articles through the passageway 8 into the tubing as the latter is being extruded.

The apparatus shown in Figure 1 may be set up to extrude tubing in a vertical position so that the articles 9 may drop by gravity through the passageway 8 to the point where the tubing is leaving the extrusion die. As the tubing is formed by extrusion, the article 9 will travel along with it. The article 9 would be dropped into the passageway successively at spaced intervals.

The chain of articles encased in the tubing produced by the apparatus of Figure 1 may be taken off of that apparatus in the manner shown in Figure 2, the continuous chain of articles 9, 9 in the tubing 5 passing under wheel 12 onto the belt conveyor 19.

Any desired means may be utilized to cut the tubing carrying encased articles to produce either an individual article carrying the encasement thereabout, or a chain of such articles. Depending on whether individual articles are severed at this point from the chain of articles or whether a group of articles remain together in the chain, various procedures are possible.

As shown in Figure 3, there may be produced a chain of sheath closures or articles 9, 9 spaced from each other by the spacings 10 within the continuous length of extruded tubing 5. Where an empty package, sealed at one end, as for example a cardboard film box is to be ensheathed and subsequently the film roll inserted, the following procedure may be carried out. The empty packages sealed at one end, are fed into the tubing as the latter is being extruded as explained above, the empty packages being fed, however, alternately with the open end forward and the sealed end forward. This will give a series of ensheathed empty packages 9, 9 as shown in Figure 3A with the sealed ends of adjacent packages facing each other as shown at 9a, 9a alternating with adjacent packages having the open ends facing each other as shown at 9b, 9b. The air pressure in the tubing during extrusion is varied by means of the air lock so that a small amount of air pressure is produced in the tubing at the place 10b where the open ends of the packages face each other to produce a bulge 20b in the tubing. At the place 10a where the sealed ends of the package face each other, the production of a small vacuum shrinks the tubing at this place as shown at 20a. The operations are alternated to produce the chain shown in Figure 3A.

A chain of such sheathed articles shown in Figure 3 may have the tubing cut either automatically or manually through the tubing at points 20, 20 in the spaces 10, 10 between the individual articles 9, 9 to produce a single article 9 carrying the tubing 5 as an encasement therefor with the ends of tubing 21, 22 extending over the ends of the article 9, as shown in Figure 4. Or if the chain of sheathed articles shown in Figure 3A is cut through at points 20a and 20b, an article is produced as shown in Figure 4A in which the container 9 is shown having the sheath 5a, the open end 9b of the container having the adjacent end 9c of the sheath flaring outwardly while the sealed end 9a of the container has the shrink end 9d of the sheath. Further procedure depends on the nature of the article being encased.

If the article 9 is a filled contained then the protruding ends 21, 22 of the tubing 5 as shown in Figure 4, may be folded over and heat sealed electronically or otherwise to seal the ends as shown at 23, 24 of Figures 5 and 6 so that a fully encased or protected article 9 within the covering 5, 23, 24 is thus obtained. Figure 7 illustrates a package of cigarettes which has been encased in this way, the cigarette package 25 carrying the encasement or sheath 26 of synthetic resinous plastic or other thermoplastic material extruded and produced in the manner set forth above.

If the article utilized is an unfilled container, as shown in Figure 8, such container or closure 27 carries the protective covering 28, only one end 29 of which has been sealed at this point about the bottom 30 of the closure 27, the other end of the container 31 being open with the extruded tubing end 32 thereabout. Thus the unfilled container may then be filled with any type of article, fluent material or otherwise, the end 31 of the container closed, and the end 32 of the plastic tubing folded thereabout and sealed thereover as explained above for the filled packages. A similar procedure may be followed in utilizing the unfilled container of Figure 4A.

Where the articles being encased, are discrete lengths of tubings such as metal tubing utilizable for example, for flashlight casings, a length of metal tubing 33 as shown in Figure 10 having threaded ends 34, 35 will when severed from the chain of sheathed articles have the general appearance shown in Figure 4. The ends of the extruded tubing covering the threaded ends 34 and 35 of the tube 33 may then be removed by stripping it off of such threaded parts of the brass tube or other metal tube to leave the article shown in Figure 10 carrying the protective coating 36 which may be of insulating material tightly adherent and even welded to the metal tube to produce the casing for the purposes shown.

Where the articles being encased are in the nature of dry cells, the protruding ends of the tubing similar to that shown at 21 and 22 in Figure 4 may be cut off at the edges 37 and 38 of the dry cell 39 as shown in Figure 11 to produce such dry cell having the protective and insulating wall covering 40 of extruded plastic while the metal bottom 41 of the dry cell and the terminal 42 are thus exposed for electric contact in the usual way.

The invention thus results in the production of packaged articles carrying protective coverings or sheaths or discrete lengths of tubing or other rigid articles enpackaged or encased by thermoplastic materials, the operations being simple and economical and producing coverings in situ on the desired articles that fit closely and may as set forth above be tightly adherent or welded to the articles when desired.

In some cases, where desired, the tubing carrying intermittently spaced articles therein, may be heat sealed in the spaces between the articles by the application of pressure to the tubing shortly after it emerges from the die and while the tubing is still hot from the extrusion step. In this way immediate heat sealing may be produced by compressing the walls of the tubing together. As shown in Figure 12, the tubing 45 as it emerges from the die 46 within which it has received the article 47 in the same manner as explained above in connection with Figure 1, passes immediately between two sets of compression members 48, 49 having arms 50, 50 and 51, 51 which rotate syncronously so that a pair of arms 50 and 51 simultaneously compress the tube 45 as shown at 52 to heat seal the tubing at this point, this operation taking place while the tubing is advancing from extrusion. Immediately following the compression elements which heat seal the tubing, a water curtain 53 from the ring 54 may be applied to rigidify the resin about the article 47. Where such heat sealing is utilized it is only necessary to cut through the chain of encased articles at points 52, 52 to produce an individual article or package fully encased with the protective thermoplastic covering.

In the modification shown in Figures 13 and 14, the invention is applied to the production of collapsible tubes or similar articles. This phase of the invention is carried out as explained above for Figures 1, etc., the tubing 5 being extruded as explained above for the other examples but the articles which are intermittently inserted into the tubing 5 during its extrusion, may be a series of closure ends 55, 55 spaced apart within the tubing 5 a distance to form spaces 56, 56 of a length substantially equal to the length of individual collapsible tube to be made. Such closure ends 55 may thus be heat sealed or welded as explained above to the tubing 5 at their areas of contact 57, 57. Each closure end 55 may take the form as shown of a hollow body portion 58 having a notched or grooved side wall 59 with a tapered shoulder 60 joined to the neck portion 61 which may be threaded as shown at 62 for reception of a conventional cap (not shown). The closure ends may be made of any desired material such as metal, plastic, etc. Desirably they may be of rigid plastic such as synthetic resins, thermoplastic, etc., for instance methyl methacrylate, phenol formaldehyde or of metal such as tin, aluminum, etc. During the extrusion and formation of a chain of this character, the air pressure within the tubing may desirably remain constant. After formation of the chain shown in Figure 13, the chain may be cut circumferentially by a hot knife at the point 63 thus producing a series of articles for use for tubes having a flexible elongated body portion 64 carrying the closure end 55 and open at the opposite end. If the material used for the extruded tubing 5 is flexible enough, the resulting articles may be used as collapsible tubes for tooth or other pastes, etc. Such extruded tubing 5 may for this purpose be made of plasticized vinyl or polyethylene material giving a collapsible body portion 64 carrying the rigid end 55.

The use of an air lock to control the air pressure within the tubing has been indicated above. Any type of means may be used for this purpose which serves to seal the passage 8 through which the articles pass as the tubing is being extended. A simple form of device for this purpose is an inner liner placed within the core in the passage 8, fitted loosely therein with an air inlet passage leading to the space between the liner and the core wall forming the passage. The end of the liner is provided with a loose fitting peripheral flap that seals off the space so that pressure or vacuum produced at the air inlet passage controls the pressure or vacuum in the passage 8. In this way the inlet is alternatively sealed and unsealed as the articles are inserted and vacuum or pressure, applied intermittently.

A more exact control may be obtained by means of the following. The articles are fed into the passage 8 from a closed cylindrical housing within which is a rotatable article carrier which may be in the form of a rotor member having a series of open ended compartments for the articles. The rotor may be motor driven through the shaft of the rotor. As the rotor rotates, it receives articles from a hopper feeding through an opening in the cover. Rotation of the rotor carries the article to a point in the carrier where an opening in the floor of the housing of the carrier communicates with a conduit directly over the passage 8 in the extruding die. At this point the article may pass into the passage 8 from the carrier and the operation is exactly as explained above in connection with Figure 1, for example. While the article may drop by gravity from the passage in the rotor to the passage 8, more positive feeding may be had by a plunger operating to force the article out of the carrier. An air pipe connection to the conduit between the carrier and die enables pressure or vacuum to be produced intermittently or otherwise as desired. By having the rotor fit snugly within the casing, a sufficient seal is obtained in maintenance of the pressure conditions desired.

The present specification is a division of application Serial No. 575,856, filed February 2, 1945, now Patent No. 2,452,607, entitled Methods of Packaging.

Having thus set forth my invention, I claim:

1. The method of producing plastic sheathed discrete lengths of rigid tubing which comprises extruding a heated thermoplastic resin in the form of a continuous flexible tubing conforming substantially to the cross-sectional shape of the rigid tubing, inserting a series of discrete lengths of rigid tubing having at least one threaded end intermittently within the extruded tubing after the latter has attained its tubular shape and as the latter is being extruded in such manner that the discrete lengths of rigid tubing are spaced from each other within the flexible tubing, and rigidifying said flexible tubing, said discrete lengths being of such a size that each discrete length is in intimate contact with the wall of the extruded tubing, the discrete lengths being so spaced that an unfilled portion of tubing extending beyond each discrete length, cutting the flexible tubing adjacent the ends of the rigid tubing, and removing the thermoplastic from at least one threaded end of the rigid tubing to expose the threads thereon.

2. The method as set forth in claim 1, in which the discrete lengths of rigid tubing are spaced in the flexible tubing as the latter is being formed at substantially the temperature of extrusion to weld the flexible tubing to the discrete lengths of rigid tubing, and chilling the resultant article to rigidify the thermoplastic resin.

CHARLES E. SLAUGHTER.

REFERENCES CITED

The following references are of record in the file of this patent:

UNITED STATES PATENTS

| Number | Name | Date |
|---|---|---|
| 368,591 | Jones | Aug. 23, 1887 |
| 862,475 | Haywood | Aug. 6, 1907 |
| 1,558,018 | Lambert | Oct. 20, 1925 |
| 1,740,029 | Moomy | Dec. 17, 1929 |
| 1,782,526 | Beardsley | Nov. 25, 1930 |
| 1,998,356 | Brown | Apr. 16, 1935 |
| 2,027,962 | Currie | Jan. 14, 1936 |
| 2,070,600 | Jenett | Feb. 16, 1937 |
| 2,110,226 | Hill | Mar. 8, 1938 |
| 2,255,810 | Replogle | Sept. 16, 1941 |
| 2,340,260 | Clunan | Jan. 25, 1944 |
| 2,371,667 | Arena et al. | Mar. 20, 1945 |
| 2,452,607 | Slaughter | Nov. 2, 1948 |